(12) United States Patent
Fujimori et al.

(10) Patent No.: US 9,118,422 B2
(45) Date of Patent: Aug. 25, 2015

(54) PRE-EQUALIZED OPTICAL TRANSMITTER AND PRE-EQUALIZED OPTICAL TRANSMISSION METHOD

(71) Applicant: Mitsubishi Electric Corporation, Tokyo (JP)

(72) Inventors: Takafumi Fujimori, Tokyo (JP); Takashi Sugihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 39 days.

(21) Appl. No.: 14/233,267

(22) PCT Filed: Oct. 17, 2012

(86) PCT No.: PCT/JP2012/076831
§ 371 (c)(1),
(2) Date: Jan. 16, 2014

(87) PCT Pub. No.: WO2013/058276
PCT Pub. Date: Apr. 25, 2013

(65) Prior Publication Data
US 2014/0133867 A1 May 15, 2014

(30) Foreign Application Priority Data

Oct. 20, 2011 (JP) ................................. 2011-230264

(51) Int. Cl.
*H04B 10/516* (2013.01)
*H04B 10/2513* (2013.01)

(52) U.S. Cl.
CPC .......... *H04B 10/516* (2013.01); *H04B 10/2513* (2013.01); *H04B 10/5161* (2013.01); *H04B 10/5162* (2013.01); *H04B 2210/254* (2013.01)

(58) Field of Classification Search
CPC ...................... H04B 10/5161; H04B 2210/254
See application file for complete search history.

(56) References Cited

U.S. PATENT DOCUMENTS

| 2002/0191266 A1* | 12/2002 | Melloni et al. ................ 359/246 |
| 2011/0002693 A1* | 1/2011 | Mizuochi et al. ............ 398/140 |
| 2011/0074610 A1* | 3/2011 | Garg et al. ..................... 341/69 |
| 2012/0201546 A1* | 8/2012 | Mizuochi et al. ............ 398/147 |

FOREIGN PATENT DOCUMENTS

| JP | 2007 267001 | 10/2007 |
| JP | 2009 267950 | 11/2009 |
| JP | 2010 34830 | 2/2010 |

OTHER PUBLICATIONS

Zhang, F., "XPM Statistics in 100% Precompensated WDM Transmission for OOK and DPSK Formats", IEEE Photonics Technology Letters, vol. 21, No. 22, pp. 1707-1709, (Nov. 15, 2009).
International Search Report Issued Jan. 8, 2013 in PCT/JP12/076831 Filed Oct. 17, 2012.

* cited by examiner

Primary Examiner — Nathan Curs
(74) Attorney, Agent, or Firm — Oblon, McClelland, Maier & Neustadt, L.L.P.

(57) ABSTRACT

A pre-equalization optical transmitter includes: a tap coefficient selecting unit for saving, in advance, a tap coefficients for generating an RZ pre-equalization signal and an NRZ pre-equalization signal, and for selecting and outputting one of the tap coefficients according to the value of a parameter that is a factor of transmission power fluctuations; a pre-equalization signal generating unit for generating the RZ pre-equalization signal or the NRZ pre-equalization signal based on the tap coefficient; and a modulating unit for generating a pre-equalization optical transmission signal by modulating an optical signal input from a light source by using a signal obtained through D/A conversion and amplification of the RZ pre-equalization signal or the NRZ pre-equalization signal, wherein a transmission method is switched between an RZ method and NRZ method by switching the tap coefficients by the tap coefficient selecting unit.

9 Claims, 5 Drawing Sheets

PRE-EQUALIZED OPTICAL TRANSMITTER AND PRE-EQUALIZED OPTICAL TRANSMISSION METHOD

TECHNICAL FIELD

The present invention relates to a pre-equalization optical transmitter and a pre-equalization optical transmission method, and more particularly, to a pre-equalization optical transmitter and pre-equalization optical transmission method for use in optical communication.

BACKGROUND ART

One of technologies used in optical communication systems to compensate deterioration of transmission characteristics along a communication path is transmission/reception equalization in the electrical domain or the optical domain. Various compensation technologies such as transmission equalization (pre-equalization) and reception equalization have been studied for the electrical domain. For the optical domain, too, various compensation technologies such as dispersion compensating fibers have been studied. Of those, the technology of transmission equalization in the electrical domain is a method by which favorable characteristics can be obtained without causing noise enhancement. In general, fiber installation cost and fiber installation location are issues in dispersion compensation that uses a dispersion compensating fiber in optical domain. However, employing pre-equalization has an advantage in that the cost and the number of places for installing dispersion compensating fibers are reduced. Pre-equalization transmission methods include a non-return to zero (NRZ) method and a return to zero (RZ) method. As compared with the NRZ method, the RZ method is characterized in that it is strong in intersymbol interference, and its average power is smaller than that of the NRZ method when the maximum amplitude of them is equal. However, the RZ method uses more bandwidth than the NRZ method. Therefore, it should be determined whether the RZ method or the NRZ method is applied according to use conditions.

Wavelength division multiplexing (WDM) transmission is known as a method that makes large-capacity optical communication possible. WDM transmission uses a plurality of wavelengths to transmit different signals that are multiplexed. Transmission power at which signals are transmitted to an optical fiber therefore fluctuates according to the number of wavelengths multiplexed, the method of modulation, and the like. An excess/shortage of the transmission power due to this transmission power fluctuation significantly affects transmission quality.

As a solution to the problem, a method of keeping the transmission power constant by inserting a variable optical attenuator (VOA) at the transmission end has been proposed (see Patent Literature 1, for example).

Figure 6:
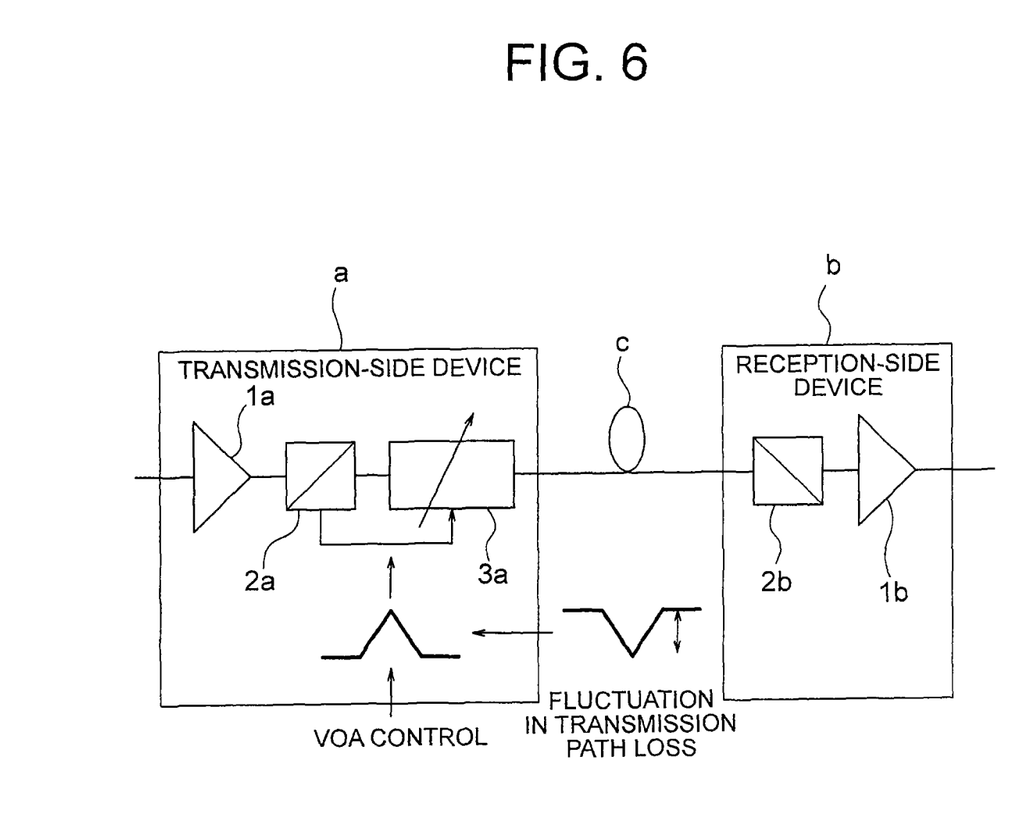
FIG. 6 is a configuration diagram illustrating the configuration of a conventional optical communication system.

FIG. 6 is a schematic view thereof. A conventional optical communication system illustrated in FIG. 6 includes a transmission-side device a, a reception-side device b, and a transmission path c, which connects the devices. The transmission-side device a includes an optical amplification unit 1a, an optical filter 2a which lets an output of the optical amplification unit 1a pass, and a VOA 3a which is connected to the optical filter 2a as the last stage. The transmission-side device a transmits signal light while keeping transmission power at which the signal light is transmitted to the transmission path c constant by using the VOA 3a. The reception-side device b includes an optical filter 2b which lets signal light received from the transmission-side device a via the transmission path c pass, and an optical amplification unit 1b which is connected to the optical filter 2b. The reception-side device b lets the received signal light pass through the optical filter 2b and uses the optical amplification unit 1b to adjust reception power. The conventional optical communication system of FIG. 6 thus employs a method for keeping transmission power constant and realizing stable communication by providing the VOA in the transmission-side device.

Using pre-equalization transmission and WDM transmission in combination reduces the cost and the number of places for installing dispersion compensating fibers and makes large-capacity transmission possible as well. In pre-equalization transmission, the amount of dispersion compensation needs to be adjusted according to the amount of transmission path dispersion. Pre-equalization transmission power fluctuates greatly according to the amount of dispersion compensation. In the case where the amount of dispersion compensation is adjusted asynchronously with a pre-equalization signal multiplexed at a plurality of wavelengths, multiplexed WDM transmission signal light could cause an even larger instantaneous power fluctuation. Adjusting the amount of dispersion compensation therefore requires an optical amplifier large in gain and a VOA high in operation speed and wide in dynamic range that is capable of keeping transmission power constant in the wake of a large and instantaneous fluctuation in transmission power. This means that an expensive optical amplifier and VOA need to be mounted. Further, if the mounted VOA cannot keep up with transmission power fluctuations, there is a possibility of deterioration in transmission quality and a failure in the reception-side equipment.

CITATION LIST

Patent Literature

[PTL 1] JP 2009-267950 A

SUMMARY OF INVENTION

Technical Problem

As described above, conventional optical communication systems employ the WDM transmission method in order to make large-capacity optical communication possible. However, combining the WDM transmission method and the pre-equalization transmission method is being studied as a way to reduce the cost and the number of areas for installing optical compensation members such as dispersion compensating fibers. When the WDM transmission method and the pre-equalization transmission method are used in combination, a transmission power fluctuation caused at the time the amount of dispersion compensation is adjusted in pre-equalization transmission deteriorates transmission quality. Preventing this requires an optical amplifier and a VOA that are high-performance and expensive, the resultant problem of which is high manufacturing cost.

The present invention has been made to solve the problem, and an object of the present invention is to obtain a pre-equalization optical transmitter and a pre-equalization optical transmission method with which high-quality and large-capacity optical communication is realized by reducing transmission power fluctuations through the switching of a method of pre-equalization transmission.

Solution to Problem

According to one embodiment of the present invention, there is provided a pre-equalization optical transmitter, which uses an RZ method and an NRZ method both as a method of transmission by switching from one method to another, including: a tap coefficient selecting unit for saving in advance a tap coefficient for generating an RZ pre-equalization signal which is used in the RZ method and a tap coefficient for generating an NRZ pre-equalization signal which is used in the NRZ method, and for selecting and outputting one of the tap coefficient for generating the RZ pre-equalization signal and the tap coefficient for generating the NRZ pre-equalization signal according to a value of a parameter that is a factor of fluctuations in transmission power; a pre-equalization signal generating unit for generating the RZ pre-equalization signal when the tap coefficient output from the tap coefficient selecting unit is the tap coefficient for generating the RZ pre-equalization signal, and generating the NRZ pre-equalization signal when the tap coefficient output from the tap coefficient selecting unit is the tap coefficient for generating the NRZ pre-equalization signal; a digital-analog conversion unit for converting the RZ pre-equalization signal or the NRZ pre-equalization signal that is output from the pre-equalization signal generating unit into an analog signal; an amplifying unit for amplifying the analog signal output from the digital-analog conversion unit; a light source for outputting an optical signal; and a modulating unit for generating a pre-equalization optical transmission signal by modulating the optical signal input from the light source based on the amplified analog signal which is output from the amplifying unit, in which the tap coefficient selecting unit switches the tap coefficients according to the value of the parameter, thereby switching the method of transmission between the RZ method and the NRZ method during transmission.

Advantageous Effects of Invention

According to one embodiment of the present invention, there is provided the pre-equalization optical transmitter, which uses the RZ method and the NRZ method both as the method of transmission by switching from one method to another, including: the tap coefficient selecting unit for saving in advance the tap coefficient for generating the RZ pre-equalization signal which is used in the RZ method and the tap coefficient for generating the NRZ pre-equalization signal which is used in the NRZ method, and for selecting and outputting the one of the tap coefficient for generating the RZ pre-equalization signal and the tap coefficient for generating the NRZ pre-equalization signal according to the value of the parameter that is the factor of the fluctuations in the transmission power; the pre-equalization signal generating unit for generating the RZ pre-equalization signal when the tap coefficient output from the tap coefficient selecting unit is the tap coefficient for generating the RZ pre-equalization signal, and generating the NRZ pre-equalization signal when the tap coefficient output from the tap coefficient selecting unit is the tap coefficient for generating the NRZ pre-equalization signal; the digital-analog conversion unit for converting the RZ pre-equalization signal or the NRZ pre-equalization signal that is output from the pre-equalization signal generating unit into the analog signal; the amplifying unit for amplifying the analog signal output from the digital-analog conversion unit; the light source for outputting the optical signal; and the modulating unit for generating the pre-equalization optical transmission signal by modulating the optical signal input from the light source based on the amplified analog signal which is output from the amplifying unit, in which the tap coefficient selecting unit switches the tap coefficients according to the value of the parameter, thereby switching the method of transmission between the RZ method and the NRZ method during the transmission. Accordingly, it is possible to realize high-quality and large-capacity optical communication while reducing the transmission power fluctuations and also reducing the manufacturing cost, the installation cost, and the number of installation places through the switching of the method of pre-equalization transmission.

DESCRIPTION OF EMBODIMENTS

First Embodiment

Figure 1:
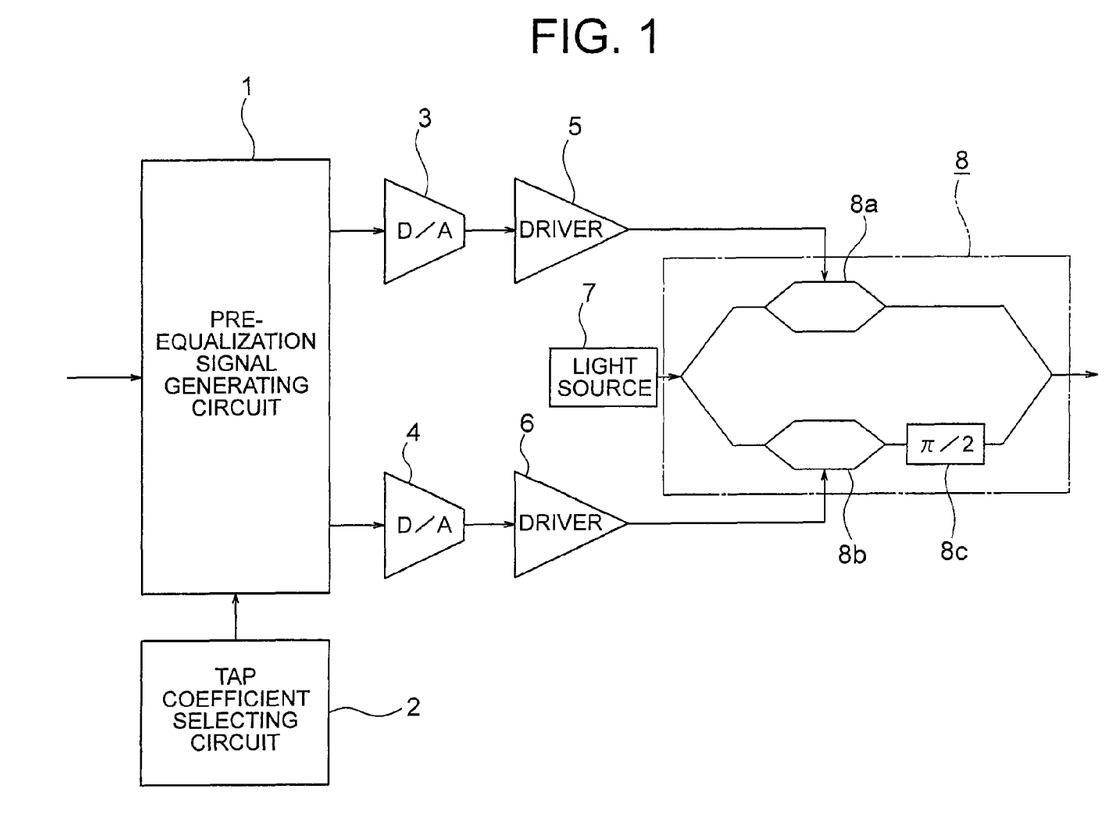
FIG. 1 is a configuration diagram illustrating the configuration of a pre-equalization optical transmitter according to a first embodiment of the present invention.

FIG. 1 is a configuration diagram illustrating the configuration of a pre-equalization optical transmitter according to a first embodiment of the present invention. The pre-equalization optical transmitter of FIG. 1 allows a selection between RZ pre-equalization transmission and NRZ pre-equalization transmission according to the value of a parameter that is a factor of deterioration in transmission path quality. The pre-equalization optical transmitter according to this embodiment is applicable to WDM transmission, too, so that the cost and the number of places for installing dispersion compensating fibers are reduced while realizing large-capacity optical communication. In this embodiment, the method of pre-equalization transmission can be selected between an RZ pre-equalization transmission method and an NRZ pre-equalization transmission method. Using these methods in combination according to the factor of transmission path deterioration keeps transmission power fluctuations small on the whole. The description given here takes the dispersion compensation amount of wavelength dispersion as an example of parameters that are factors of transmission path deterioration. However, this embodiment is not limited thereto and may use any other parameter that is a factor of transmission path deterioration.

In FIG. 1, numerical reference 1 is a pre-equalization signal generating circuit (pre-equalization signal generating unit). The pre-equalization signal generating circuit 1 generates a pre-equalization signal having an RZ pre-equalization waveform or an NRZ pre-equalization waveform based on a tap coefficient that is input from a tap coefficient selecting circuit 2, and divides the pre-equalization signal into an I-channel digital signal and a Q-channel digital signal which are then output. Numerical reference 2 is a tap coefficient selecting circuit (tap coefficient selecting unit). The tap coefficient selecting circuit (tap coefficient selecting unit) 2 stores in advance a tap coefficient for generating an RZ pre-equalization signal and a tap coefficient for generating an NRZ pre-equalization signal, selects one of the tap coefficients according to the value of the dispersion compensation amount of wavelength dispersion which is a factor of transmission path deterioration, and sets the selected tap coefficient in the pre-equalization signal generating circuit 1. Denoted by 3 and 4 are digital-analog converters (digital-analog conversion units). The digital-analog converters 3 and 4 respectively perform conversion from a digital signal to an analog signal on the I-channel digital signal and the Q-channel digital signal which are output from the pre-equalization signal generating circuit 1. Denoted by 5 and 6 are drivers (amplifying units). The drivers 5 and 6 respectively amplify outputs from the digital-analog converters 3 and 4 to an input level of a modulator 8. Denoted by 7 is a light source which emits light to be input to a modulator in which an optical signal is generated. The modulator (modulating unit) 8 generates a pre-equalization optical transmission signal by performing optical signal modulation on light from the light source 7 with the use of signals output from the drivers 5 and 6.

The modulator 8 is provided with optical modulation units 8a and 8b and an optical phase adjusting unit 8c as illustrated in FIG. 1. The optical modulation units 8a and 8b are connected in parallel to the light source 7 to generate a first optical field and a second optical field, respectively, when branched light beams from the light source 7 are input to the optical modulation units 8a and 8b. The optical phase adjusting unit 8c is connected to the optical modulation unit 8b to control a phase difference between the first optical field and the second optical field. The set phase (a relative phase difference between the I channel and the Q channel) of the optical phase adjusting unit 8c is set to, for example, π/2. The modulator 8 generates and outputs a pre-equalization optical transmission signal by performing optical signal modulation on branched light beams from the light source 7 with the optical modulation units 8a and 8b, based on signals output from the drivers 5 and 6, adjusting the phase of an output from the optical modulation unit 8b with the optical phase adjusting unit 8c, and combining an output from the optical modulation unit 8a and an output from the optical phase modulating unit 8c.

The operation of the pre-equalization optical transmitter according to the first embodiment of the present invention is described next. The tap coefficient selecting circuit 2 selects one of the tap coefficients held in advance (namely, the tap coefficient for generating an RZ pre-equalization signal and the tap coefficient for generating an NRZ pre-equalization signal), according to the value of the dispersion compensation amount of wavelength dispersion which is one of parameters constituting factors of transmission path deterioration. The tap coefficient selecting circuit 2 sends the selected tap coefficient to the pre-equalization signal generating circuit 1. The tap coefficients held in the tap coefficient selecting circuit 2 in advance are the tap coefficient for generating an RZ pre-equalization signal and the tap coefficient for generating an NRZ pre-equalization signal, which are switched at a switching point which is adjusted so that fluctuations in average power are mitigated. This adjustment is described later.

In addition to the tap coefficient sent from the tap coefficient selecting circuit 2 as described above, a data series (or a symbol series) is input to the pre-equalization signal generating circuit 1. The pre-equalization signal generating circuit 1 uses the input tap coefficient and data series (or symbol series) to execute pre-equalization processing and generate pre-equalization digital signals (an I-channel digital signal and a Q-channel digital signal). The pre-equalization processing can be a known one. Therefore, a description thereof is omitted here. The pre-equalization digital signals are converted by the digital-analog converters 3 and 4 into pre-equalization analog signals (an I-channel analog signal and a Q-channel analog signal), and are amplified by the drivers 5 and 6 to an input level of the modulator 8. Next, the modulator 8 performs optical signal modulation on light from the light source 7 based on the amplified pre-equalization analog signals from the drivers 5 and 6, to thereby generate a pre-equalization optical transmission signal. The thus generated pre-equalization optical transmission signal is transmitted to a pre-equalization optical receiver (not shown) via a transmission path (not shown).

Figure 2:
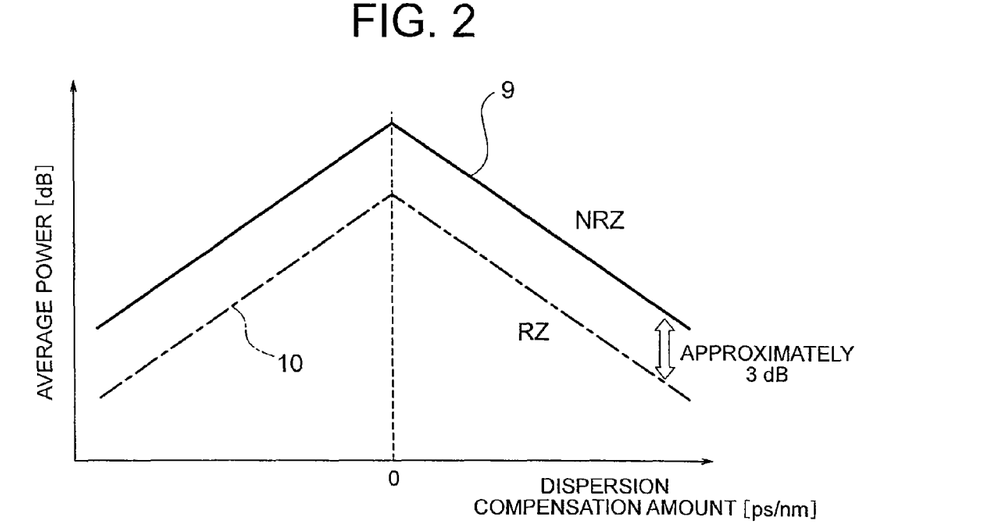
FIG. 2 is an explanatory diagram illustrating, in a graph, fluctuations in average transmission power that occur after modulation suited to the respective amounts of dispersion compensation is made for pre-equalization transmission in the pre-equalization optical transmitter according to the first embodiment of the present invention.

FIG. 2 illustrates fluctuations in the average value of transmission power (hereinafter referred to as average power) that occur after the modulation of the modulator 8 according to the respective amounts of dispersion compensation when pre-equalization transmission is performed. In FIG. 2, the horizontal axis represents the amount of dispersion compensation and the vertical axis represents the average power. A solid line 9 in FIG. 2 represents fluctuations in the average power of a pre-equalization signal in the NRZ method. A dot-dash line 10 in FIG. 2 represents fluctuations in the average power of pre-equalization signal in the RZ method.

As illustrated in FIG. 2, the average power is large when (the absolute value of) the dispersion compensation amount of wavelength dispersion is small in the NZR method and the RZ method both. The average power takes a maximum value when the dispersion compensation amount is 0 ps/nm (no wavelength dispersion compensation). When (the absolute value of) the dispersion compensation amount is large, on the other hand, the average power of the multiplexed pre-equalization signal is small because the impulse response of wavelength distribution spreads in the temporal direction. There is an absolute value difference of approximately 9 dB between the minimum value and maximum value of the average power in the NRZ method. Similarly, there is an absolute value difference of approximately 9 dB between the minimum value and maximum value of the average power in the RZ method. In the respective amounts of dispersion compensation, there is also an absolute value difference of approximately 3 dB between the average power in the NRZ method and the average power in the RZ method, with the average power in the NRZ method being larger all the time. While the description here takes the dispersion compensation amount of wavelength dispersion as an example of parameters that are factors of transmission path deterioration, this embodiment is not limited thereto and other parameters may be used. In the case where other parameters are used, too, the NRZ method and the RZ method have average-power characteristics according to the parameter.

Figure 3:
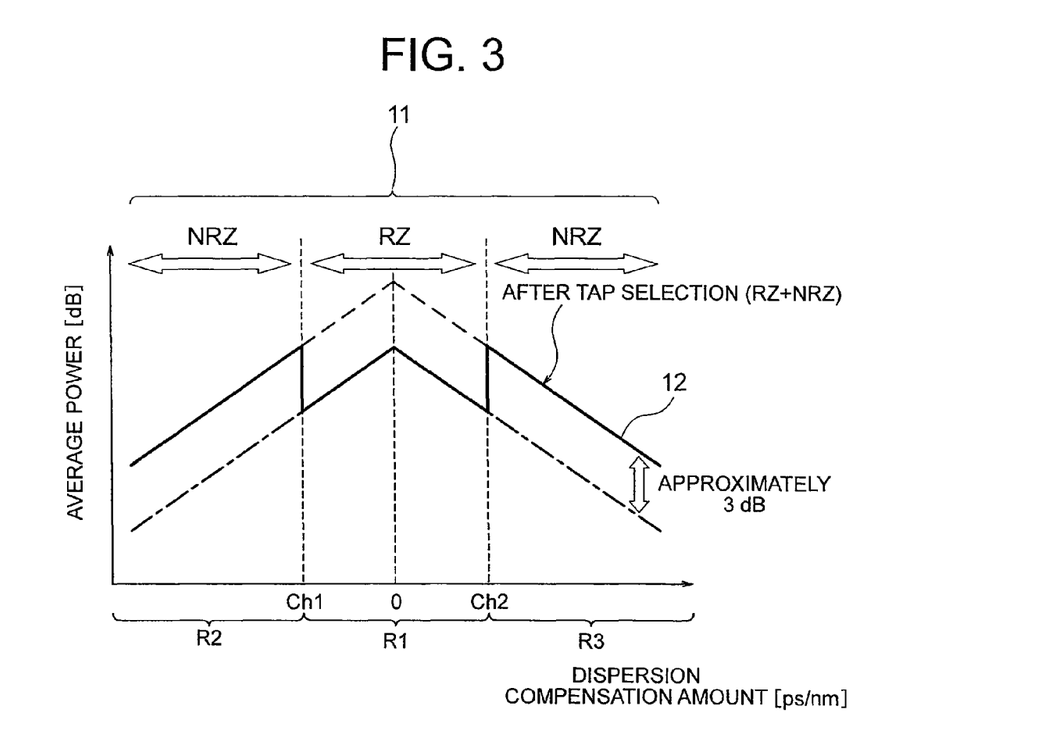
FIG. 3 is an explanatory diagram illustrating, in a graph, average transmission power that is observed when one of RZ pre-equalization transmission and NRZ pre-equalization transmission is selected according to wavelength dispersion in the pre-equalization optical transmitter according to the first embodiment of the present invention.

FIG. 3 illustrates average transmission power that is observed when one of RZ pre-equalization transmission and NRZ pre-equalization transmission is selected according to the value of the dispersion compensation amount of wavelength dispersion in the pre-equalization optical transmitter according to the first embodiment of the present invention, based on the average-power characteristics that are illustrated in the graph of FIG. 2. Denoted by 11 in FIG. 3 is the method of transmission (one of RZ pre-equalization transmission and NRZ pre-equalization transmission) that is selected according to the wavelength dispersion compensation amount. A bold line 12 in FIG. 3 represents average transmission power that is observed when a switch is made between RZ pre-equalization transmission and NRZ pre-equalization transmission.

As illustrated in FIG. 3, the pre-equalization optical transmitter according to the first embodiment of the present invention mitigates transmission power fluctuations in pre-equalization by selecting RZ pre-equalization transmission in which transmission power as average power 12 is small for a region R1, where (the absolute value of) the dispersion compensation amount is small, and selecting NRZ pre-equalization transmission in which transmission power is large for regions R2 and R3, where (the absolute value of) the dispersion compensation amount is large. An absolute value difference of approximately 3 dB which is a difference in average power between RZ pre-equalization transmission and NRZ pre-equalization transmission is reduced in this manner. In the example of FIG. 3, the NRZ method is selected for a region from the left edge of the graph where the absolute value of the dispersion compensation amount is largest to a switching point Ch1 (the region 2), the RZ method is selected for a region from the switching point Ch1 to a switching point Ch2 (the region R1), and the NRZ method is selected for a region from the switching point Ch2 to the right edge of the graph where the absolute value of the dispersion compensation amount is largest (the region R3). The switching is executed by the tap coefficient selecting circuit 2. Specifically, the NRZ method is selected for the duration of a period in which the tap coefficient selecting circuit 2 outputs the tap coefficient for generating an NRZ pre-equalization signal, whereas the RZ method is selected for the duration of a period in which the tap coefficient selecting circuit 2 outputs the tap coefficient for generating an RZ pre-equalization signal. The tap coefficient selecting circuit 2 thus makes a switch by selecting which tap coefficient is output. The switching operation of the tap coefficient selecting circuit 2 involves setting, in advance, thresholds Ch1 and Ch2 for the value of the dispersion compensation amount and switching the tap coefficient to be output between the tap coefficient for generating an NRZ pre-equalization signal and the tap coefficient for generating an RZ pre-equalization signal when the value of the dispersion compensation amount reaches Ch1 or Ch2. The thresholds Ch1 and Ch2 can be set as, for example, values that the dispersion compensation amount takes when the value of the average power in the NRZ method is equal to the maximum value of the average power in the RZ method. Alternatively, a threshold for the average power in the NRZ method may be set in advance so that, when the value of this average power reaches the threshold, the tap coefficient selecting circuit 2 switches the tap coefficient to be output from the tap coefficient for generating an NRZ pre-equalization signal to the tap coefficient for generating an RZ pre-equalization signal. The threshold can be set as, for example, the maximum value of the average power in the RZ method. Then the method of transmission is switched from NRZ to RZ at the time the value of the average power in the NRZ method is equal to the threshold.

The amount of attenuation of average power can be adjusted over the entire codomain of the dispersion compensation amount by using RZ pre-equalization transmission and NRZ pre-equalization transmission in combination based on the value of the dispersion compensation amount of wavelength dispersion which is one of parameters constituting factors of transmission path deterioration as illustrated in FIG. 3. The absolute value difference between the minimum value and maximum value of the average power 12 which is illustrated in FIG. 3 is compared against the absolute value difference between the minimum value and maximum value of the average power 9 in the NRZ method and the absolute value difference between the minimum value and maximum value of the average power 10 in the RZ method which are illustrated in FIG. 2. The comparison shows that the absolute value difference of the average power 12 is significantly smaller than the absolute value difference of the average power 9 and the absolute value difference of the average power 10.

As described above, the tap coefficient selecting circuit 2 in this embodiment makes a switch to output one of the tap coefficient for generating an NRZ pre-equalization signal and the tap coefficient for generating an RZ pre-equalization signal according to the value of a parameter that is a factor of transmission path deterioration. The method of transmission can therefore be switched between the NRZ method and the RZ method, with the result that fluctuations in average transmission power are reduced on the whole. Specifically, the dispersion compensation amount of wavelength dispersion is used as a parameter that is a factor of transmission path deterioration, and RZ pre-equalization transmission in which transmission power is small is selected for a region where (the absolute value of) the dispersion compensation amount is less than a given threshold, whereas NRZ pre-equalization transmission in which transmission power is large is selected for a region where (the absolute value of) the dispersion compensation amount is equal to or more than the given threshold. The pre-equalization optical transmitter according to the first embodiment is thus capable of mitigating transmission power fluctuations and realizes pre-equalization transmission in which the load on an optical amplifier and a VOA is light by using a combination of RZ pre-equalization transmission and NRZ pre-equalization transmission and switching between the two according to the factor of transmission path deterioration. This eliminates the conventional need to use an optical amplifier and a VOA that are high-performance and expensive, thereby reducing manufacturing cost. At the same time, reducing transmission power fluctuations keeps transmission quality high all the time. This embodiment accomplishes high-quality and large-capacity transmission while reducing the cost and the number of places for installing dispersion compensating fibers and keeping the manufacturing cost low in the manner described above.

Second Embodiment

Figure 4:
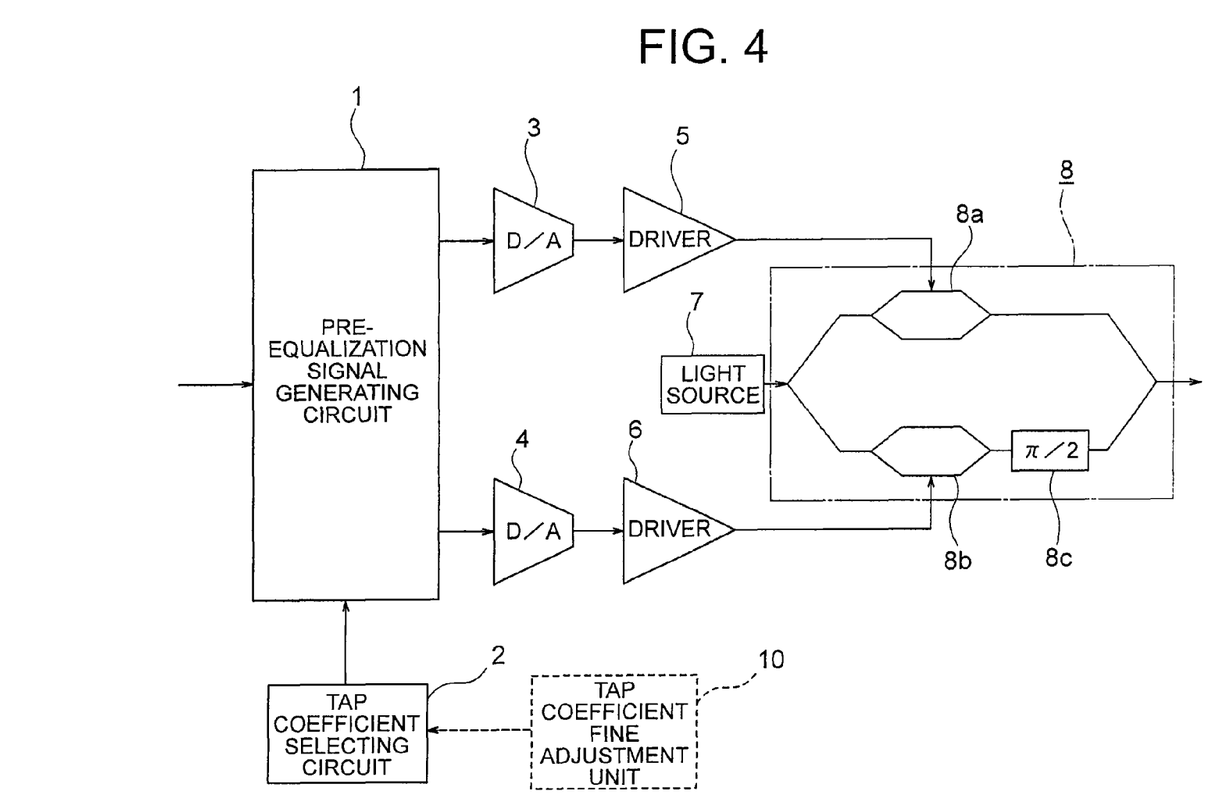
FIG. 4 is a configuration diagram illustrating the configuration of a pre-equalization optical transmitter according to a second embodiment of the present invention.

FIG. 4 is a configuration diagram illustrating the configuration of a pre-equalization optical transmitter according to a second embodiment of the present invention. In FIG. 4, a tap coefficient fine adjustment unit 10 is provided in the outside of the pre-equalization optical transmitter.

The first embodiment described above reduces fluctuations in average transmission power by storing in advance a tap coefficient for generating an RZ pre-equalization signal and a tap coefficient for generating an NRZ pre-equalization signal, using the NRZ method and the RZ method in combination in the tap coefficient selecting circuit 2, and switching between the NRZ method and the RZ method according to the value of a parameter that is a factor of transmission path deterioration. In this embodiment, the tap coefficient for generating an RZ pre-equalization waveform and the tap coefficient for generating an NRZ pre-equalization waveform are finely adjusted by the tap coefficient fine adjustment unit 10 disposed in the outside. The finely adjusted tap coefficients are transmitted (or downloaded) to the tap coefficient selecting circuit 2 to be saved.

The tap coefficient fine adjustment unit 10 makes a fine adjustment to tap coefficients in regions that precedes and follows a point where the method of transmission is switched. In the following description, the tap coefficient adjustment described in the first embodiment, i.e., switching between the tap coefficient for generating an NRZ pre-equalization signal and the tap coefficient for generating an RZ pre-equalization signal, is referred to as "rough adjustment" of tap coefficients. On the other hand, the tap coefficient adjustment described in the second embodiment is referred to as "fine adjustment" of tap coefficients. The purpose of "rough adjustment" is overall mitigation of fluctuations in average power through the dispersion compensation amount, whereas "fine adjustment" is aimed for the mitigation of fluctuations in average power at a point of switching between the RZ method and the NRZ method. The rest of the configuration is the same as that of the first embodiment, and a description thereof is omitted here.

Because of an average-power difference of approximately 3 dB between RZ pre-equalization transmission and NRZ pre-equalization transmission, a power fluctuation by an average-power difference of approximately 3 dB occurs instantaneously at points (Ch1 and Ch2) of switching between RZ pre-equalization transmission and NRZ pre-equalization transmission as illustrated in FIGS. 2 and 3. Accordingly, while the amount of attenuation of average power can be adjusted by making only the "rough adjustment" of tap coefficients described in the first embodiment which is a simple switch between the RZ method and the NRZ method, it is more desirable to make a "fine adjustment" for preventing the instantaneous power fluctuation at a switching point in addition to the "rough adjustment" of FIG. 3. This embodiment therefore describes a mode where the "fine adjustment" is made.

Figure 5:
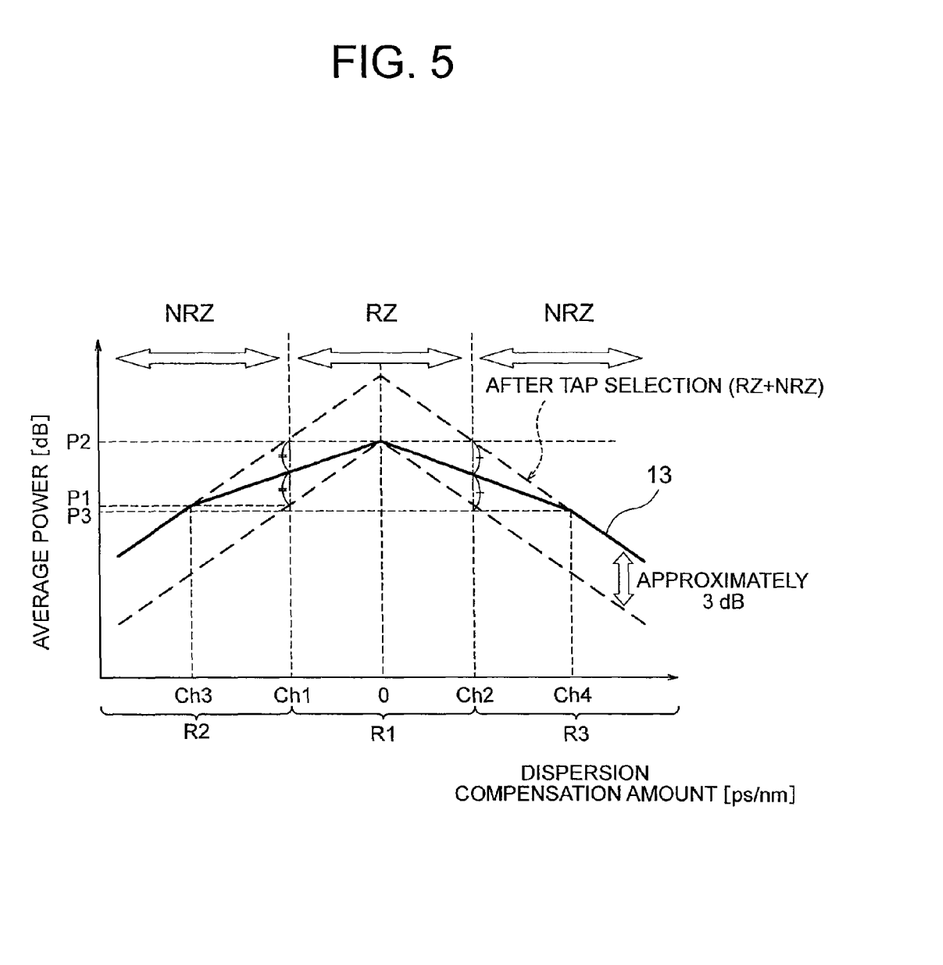
FIG. 5 is an explanatory diagram illustrating, in a graph, average transmission power that is observed when a difference in average power at a point of switching between RZ pre-equalization transmission and NRZ pre-equalization transmission is adjusted by applying other forms of pre-equalization than dispersion compensation in the pre-equalization optical transmitter according to the second embodiment of the present invention.

FIG. 5 illustrates average transmission power that is observed when the "fine adjustment" is made in order to prevent the power fluctuation in the pre-equalization optical transmitter according to the second embodiment of the present invention. In FIG. 5, a difference in average power at a point of switching between RZ pre-equalization transmission and NRZ pre-equalization transmission is finely adjusted by further applying pre-equalization that takes into account other factors of transmission path deterioration than the dispersion compensation amount. A bold line 13 in FIG. 5 represents average transmission power that is observed when the fine adjustment is made and switching between RZ pre-equalization transmission and NRZ pre-equalization transmission is executed.

As illustrated in FIG. 3, simply combining RZ pre-equalization transmission and NRZ pre-equalization transmission is not enough, since a fluctuation in average power of approximately 3 dB occurs at points (Ch1 and Ch2) of switching between RZ pre-equalization transmission and NRZ pre-equalization transmission. This fluctuation in average power needs to be mitigated. In the case of pre-equalization through the dispersion compensation amount or other similar cases, an increase in the amount of pre-equalization causes the impulse response of frequency characteristics of a compensation target to spread wider in the temporal axis direction, and accordingly lowers the average transmission power of a multiplexed pre-equalization signal. The average transmission power can therefore be adjusted finely by adjusting the amount of pre-equalization through an adjustment made to the compensation of other transmission deterioration factors than the dispersion compensation amount and to the method of generating a pre-equalization signal.

In FIG. 5, a region from the left edge of the graph where the absolute value of the dispersion compensation amount is largest to the switching point Ch1 is denoted by R2, and a region from the switching point Ch2 to the right edge of the graph where the dispersion compensation amount is largest is denoted by R3. A fine adjustment switching point Ch3 is suitably set within the region R2, and a fine adjustment switching point Ch4 is suitably set within the region R3. Tap coefficients are finely adjusted so that the changes in average power is gentle from an average-power value P1 of the NRZ method at the fine adjustment switching point Ch3 to an average-power value P2 of the RZ method at the time when the dispersion compensation amount reaches 0 ps/nm, and from the average-power value P2 of the RZ method at the time when the dispersion compensation amount reaches 0 ps/nm to an average-power value P3 of the NRZ method at the fine adjustment switching point Ch3. In other words, the tap coefficient fine adjustment unit 10 finely adjusts tap coefficients in regions before and after the switching points Ch1 and Ch2 where the method of transmission is switched, thereby making an adjustment so that the changes in average power is gentle on the whole including the switching points Ch1 and Ch2. The point Ch3 can be set so that, for example, the amount of change in dispersion compensation amount from Ch3 to Ch1 is the same as the amount of change from Ch1 to a point where the dispersion compensation amount is 0 in FIG. 5. Similarly, the point Ch4 can be set so that, for example, the amount of change in dispersion compensation amount from Ch4 to Ch2 is the same as the amount of change from Ch2 to a point where the dispersion compensation amount is 0 in FIG. 5.

Examples of pre-equalization methods that can be applied to "fine adjustment" of the amount of pre-equalization include (1) a high-pass filter component (compensation for bandwidth limitation by an optical filter on a transmission path•compensation for bandwidth limitation of a transmitter/receiver, or compensation for a narrowing penalty of the optical filter), (2) rotating an IQ constellation, (3) mitigating the stretching of a tap coefficient when the dispersion compensation amount is large through frequency domain filtering, (4) mitigating the stretching of a tap coefficient by performing time domain filtering on the tap coefficient, and (5) generating an intermediate waveform between the RZ pre-equalization transmission waveform and the NRZ pre-equalization transmission waveform. While the tap coefficient selecting circuit 2 may make only a "rough adjustment" by switching the method of transmission as described above with reference to FIG. 3, tap coefficients may be generated by combining the "rough adjustment" with the "fine adjustment" of pre-equalization by at least one of the pre-equalization methods (1) to (5). Fine adjustment of transmission power is not limited to the pre-equalization methods (1) to (5) given above, and the amount of pre-equalization can be adjusted through any other compensation target that can be expressed as frequency characteristics.

The methods (1) to (5) are described below.

(1) The transmission power is adjusted finely based on a high-pass filter component that compensates for bandwidth limitation by an optical filter on a transmission path and/or bandwidth limitation of a transmitter/receiver. Fine adjustment of the transmission power via a high-pass filter component is characterized in that there is less chance of a transmission penalty as long as a high-frequency domain is not enhanced excessively. The high-frequency domain enhancement by a high-pass filter component increases the amount of pre-equalization, and fluctuations in average power can therefore be mitigated by adding a high-pass filter component at the time of NRZ pre-equalization transmission and adding, or not adding, a high-pass filter component that is less effective at the time of RZ pre-equalization transmission.

(2) The transmission power is adjusted finely by rotating an IQ constellation. In pre-equalization transmission, digital signal processing is performed on the transmission side, which means that the transmission side requires a digital-analog converter such as a digital-to-analog converter (DAC). The maximum amplitude at which an electrical signal can be transmitted is therefore limited by the maximum value of the DAC, and the average power can be adjusted by rotating the IQ constellation.

(3) The transmission power is adjusted finely by providing frequency filtering for limiting the frequency range of a compensation target that is used as a tap coefficient. Performing frequency filtering so as to limit the frequency range of the compensation target removes other components than one that passes through frequency filtering, thereby preventing the time domain of the impulse response from expanding. Through a fine adjustment of the impulse response length by frequency filtering, the average transmission power of a pre-equalization signal after multiplexed can be adjusted.

(4) In the method (4) where the same effect as that of the method (3) is obtained, the transmission power is adjusted finely by providing time domain filtering for limiting, in the temporal axis direction, the impulse response of frequency characteristic of a compensation target that is used as a tap coefficient. Filtering in the time domain (i.e., limiting in the temporal axis direction) the impulse response of frequency characteristics of the compensation target adjusts the impulse response length finely, and the average transmission power can accordingly be adjusted.

(5) An average-power difference of approximately 3 dB due to switching can be reduced by providing a region where an intermediate waveform between the RZ pre-equalization waveform and the NRZ pre-equalization waveform is selected between switches from one of RZ pre-equalization transmission and NRZ pre-equalization transmission to another. A tap coefficient that combines the tap coefficient for the RZ pre-equalization waveform and the tap coefficient for the NRZ pre-equalization waveform is given as an example of the intermediate waveform. The transmission power can finely be adjusted by weighted averaging processing of the tap coefficient for the RZ pre-equalization waveform and the tap coefficient for the NRZ pre-equalization waveform. An instantaneous fluctuation in average power is prevented by selecting an intermediate waveform between the RZ pre-equalization waveform and the NRZ pre-equalization waveform for respective regions that precede and follow the switching points Ch1 and Ch2 where switching between the RZ method and the NRZ method is made.

In this embodiment, tap coefficients are thus adjusted by adding, to the "rough adjustment" of FIG. 3, "fine adjustment" for steadying an instantaneous fluctuation in average power at a switching point performed by the "rough adjustment", via a pre-equalization method such as the methods (1) to (5) described above. Specifically, in order to eliminate instantaneous fluctuations in average power at the switching points Ch1 and Ch2 where tap coefficients are switched, the tap coefficient fine adjustment unit 10 uses at least one of the pre-equalization methods (1) to (5) to finely adjust the tap coefficient for the RZ pre-equalization waveform and the tap coefficient for the NRZ pre-equalization waveform in respective regions before and after the switching points Ch1 and Ch2 which include the switching points Ch1 and Ch2. The finely adjusted tap coefficients are transmitted to the tap coefficient selecting circuit 2 to be saved in the tap coefficient selecting circuit 2. The tap coefficient selecting circuit 2 then selects one of the saved tap coefficient for the RZ pre-equalization waveform and the saved tap coefficient for the NRZ pre-equalization waveform according to the value of the dispersion compensation amount, and outputs the selected tap coefficient to the pre-equalization signal generating circuit 1 in the manner described in the first embodiment.

Tap coefficients in this embodiment are thus generated by combining "rough adjustment" with "fine adjustment" that uses one or more pre-equalization method, and are output from the tap coefficient selecting circuit 2 to the pre-equalization signal generating circuit 1. Consequently, power fluctuations that occur upon switching are prevented and fluctuations in average power are given a gentle profile on the whole including the switching points as illustrated in FIG. 5.

Which of the pre-equalization methods (1) to (5) is to be used by the tap coefficient fine adjustment unit 10 may be set at the design stage, or may be selected suitably by an operator (user) when tap coefficients to be saved in the tap coefficient selecting circuit 2 are generated.

The transmission power is larger at a low dispersion compensation amount than in pre-equalization transmission, irrespective of whether it is RZ pre-equalization transmission or NRZ pre-equalization transmission. The transmission power is particularly large at a wavelength dispersion compensation amount of 0 ps/nm (no wavelength dispersion compensation). However, fluctuations of the transmission waveform are substantially binary when the wavelength dispersion compensation amount is 0 ps/nm, and transmission power fluctuations can therefore be mitigated even more by simply lowering the amplitude and accordingly lowering the transmission power.

As described above, the pre-equalization optical transmitter according to the second embodiment of the present invention provides the same effect as that of the first embodiment. Further, the pre-equalization optical transmitter according to the second embodiment of the present invention has an additional effect of mitigating fluctuations in average power at a tap coefficient switching point, since the tap coefficient fine adjustment unit 10 for preventing an instantaneous fluctuation in average power at a tap coefficient switching point is equipped. Transmission quality is thus made even more stable.

REFERENCE SIGNS LIST 1 pre-equalization signal generating circuit, 2 tap coefficient selecting circuit, 3, 4 digital-analog converter, 5, 6 driver, 7 light source, 8 modulator, 10 tap coefficient fine adjustment unit.

The invention claimed is:

1. A pre-equalization optical transmitter, which uses an RZ method and an NRZ method both as a method of transmission by switching from one method to another, comprising:
a tap coefficient selecting unit for saving in advance a tap coefficient for generating an RZ pre-equalization signal which is used in the RZ method and a tap coefficient for generating an NRZ pre-equalization signal which is used in the NRZ method, and for selecting and outputting one of the tap coefficient for generating the RZ pre-equalization signal and the tap coefficient for generating the NRZ pre-equalization signal according to a value of a parameter that is a factor of fluctuations in transmission power;
a pre-equalization signal generating unit for generating the RZ pre-equalization signal when the tap coefficient output from the tap coefficient selecting unit is the tap coefficient for generating the RZ pre-equalization signal, and generating the NRZ pre-equalization signal when the tap coefficient output from the tap coefficient selecting unit is the tap coefficient for generating the NRZ pre-equalization signal;
a digital-analog conversion unit for converting the RZ pre-equalization signal or the NRZ pre-equalization signal output from the pre-equalization signal generating unit into an analog signal;
an amplifying unit for amplifying the analog signal output from the digital-analog conversion unit;
a light source for outputting an optical signal; and
a modulating unit for generating a pre-equalization optical transmission signal by modulating the optical signal input from the light source based on the amplified analog signal which is output from the amplifying unit,
wherein the tap coefficient selecting unit switches the tap coefficients according to the value of the parameter, thereby switching the method of transmission between the RZ method and the NRZ method during transmission.

2. The pre-equalization optical transmitter according to claim 1,
wherein the parameter used by the tap coefficient selecting unit to select the one of the tap coefficients comprises a dispersion compensation amount of wavelength dispersion, and
wherein the tap coefficient selecting unit selects the tap coefficient for generating the RZ pre-equalization signal when a value of the dispersion compensation amount is less than a predetermined threshold, and selects the tap coefficient for generating the NRZ pre-equalization signal when the value of the dispersion compensation amount is equal to or more than the predetermined threshold.

3. The pre-equalization optical transmitter according to claim 1, further comprising a tap coefficient fine adjustment unit for finely adjusting the tap coefficients in regions before and after a switching point at which the tap coefficients are switched, in order to prevent a transmission power fluctuation at the switching point,
wherein the tap coefficient selecting unit saves, in advance, tap coefficients that are obtained through the fine adjustment performed by the tap coefficient fine adjustment unit.

4. The pre-equalization optical transmitter according to claim 3, wherein the tap coefficient fine adjustment unit performs the fine adjustment to the tap coefficients by compensating, through pre-equalization, for bandwidth limitation by an optical filter on the transmission path, bandwidth limitation of the pre-equalization optical transmitter, and/or bandwidth limitation of a receiver that receives a signal transmitted from the pre-equalization optical transmitter.

5. The pre-equalization optical transmitter according to claim 3, wherein the tap coefficient fine adjustment unit performs the fine adjustment to the tap coefficients through an adjustment of the transmission power by rotating an IQ constellation.

6. The pre-equalization optical transmitter according to claim 3, wherein the tap coefficient fine adjustment unit performs the fine adjustment to the tap coefficients by executing frequency filtering for limiting a frequency range.

7. The pre-equalization optical transmitter according to claim 3, wherein the tap coefficient fine adjustment unit performs the fine adjustment to the tap coefficients by executing time domain filtering for limiting, in a temporal axis direction, an impulse response of frequency characteristics that are used as the tap coefficients.

8. The pre-equalization optical transmitter according to claim 3, wherein the tap coefficient fine adjustment unit performs the fine adjustment to the tap coefficients by generating a tap coefficient for generating a pre-equalization signal that has an intermediate waveform between a waveform of the RZ pre-equalization signal and a waveform of the NRZ pre-equalization signal.

9. A pre-equalization optical transmission method, which uses an RZ method and an NRZ method both as a method of transmission by switching from one method to another, comprising:
a tap coefficient selecting step of saving in advance a tap coefficient for generating an RZ pre-equalization signal which is used in the RZ method and a tap coefficient for generating an NRZ pre-equalization signal which is used in the NRZ method, and of selecting and outputting one of the tap coefficient for generating the RZ pre-equalization signal and the tap coefficient for generating the NRZ pre-equalization signal according to a value of a parameter that is a factor of fluctuations in transmission power;
a pre-equalization signal generating step of generating the RZ pre-equalization signal when the tap coefficient output in the tap coefficient selecting step is the tap coefficient for generating the RZ pre-equalization signal, and generating the NRZ pre-equalization signal when the tap coefficient output in the tap coefficient selecting step is the tap coefficient for generating the NRZ pre-equalization signal;
a digital-analog conversion step of converting the RZ pre-equalization signal or the NRZ pre-equalization signal that is output in the pre-equalization signal generating step into an analog signal;
an amplifying step of amplifying the analog signal output in the digital-analog conversion step;
an optical signal outputting step of outputting an optical signal; and
a transmission signal generating step of generating a pre-equalization optical transmission signal by modulating the optical signal which is output in the optical signal outputting step based on the amplified analog signal which is output in the amplifying step,
wherein, in the tap coefficient selecting step, the tap coefficients are switched according to the value of the parameter, thereby switching the method of transmission between the RZ method and the NRZ method during transmission.

* * * * *